US009688799B2

(12) United States Patent
Chamayou et al.

(10) Patent No.: US 9,688,799 B2
(45) Date of Patent: Jun. 27, 2017

(54) SCAVENGER INJECTION

(71) Applicant: INEOS EUROPE AG, Rolle (CH)

(72) Inventors: Jean-Louis Chamayou, Carry le Rouet (FR); Renaud Viguier, Sete (FR)

(73) Assignee: INEOS EUROPE AG, Rolle (CH)

(*) Notice: Subject to any disclaimer, the term of this patent is extended or adjusted under 35 U.S.C. 154(b) by 0 days.

(21) Appl. No.: 15/104,313

(22) PCT Filed: Dec. 15, 2014

(86) PCT No.: PCT/EP2014/077774
§ 371 (c)(1),
(2) Date: Jun. 14, 2016

(87) PCT Pub. No.: WO2015/097012
PCT Pub. Date: Jul. 2, 2015

(65) Prior Publication Data
US 2016/0326293 A1    Nov. 10, 2016

(30) Foreign Application Priority Data

Dec. 23, 2013  (EP) .................................. 13199329

(51) Int. Cl.
*C08F 2/00*  (2006.01)
*B01J 19/18*  (2006.01)
(Continued)

(52) U.S. Cl.
CPC ......... *C08F 236/06* (2013.01); *B01J 19/2455* (2013.01); *C08F 2/005* (2013.01);
(Continued)

(58) Field of Classification Search
CPC ........ C08F 2/005; C08F 236/06; C08F 10/00; C08F 2/01; C08F 2/34; C08F 2/007; B01J 19/2455; B01J 2219/24; Y02P 20/582
(Continued)

(56) References Cited

U.S. PATENT DOCUMENTS 5,763,543 A    6/1998 Muhle et al.
2012/0136127 A1*  5/2012 Hussein .................... B01J 8/22
526/65

FOREIGN PATENT DOCUMENTS

EP       2 374 823 A1   10/2011
WO   WO 94/28032 A1   12/1994
(Continued)

OTHER PUBLICATIONS

Specification of Co-pending National Phase U.S. Appl. No. 15/104,399, filed Jun. 14, 2016; PCT Int'l Application No. PCT/EP2014/077778, WO 2015/097013 A1, filed Dec. 15, 2014; 25 pgs.

*Primary Examiner* — William Cheung
(74) *Attorney, Agent, or Firm* — Nixon & Vanderhye P.C.

(57) ABSTRACT

Process for the polymerization of olefins in a polymerization reactor system including (i) a gas phase reactor having a gas outlet and one or more withdrawal lines for withdrawal of a polymer-containing stream, (ii) a recycle loop for recycling gas exiting the reactor through the gas outlet back to the reactor, (iii) a polymer separation system for separating reactants from the polymer product in the withdrawn polymer-containing stream, and (iv) a recycle system for recycling reactants removed from the reactor in the withdrawn polymer-containing stream back to the reactor. A scavenger is introduced directly into one or more of the recycle loop, the polymer separation system and the recycle system.

16 Claims, 1 Drawing Sheet

(51) Int. Cl.
    *C08F 236/06* (2006.01)
    *B01J 19/24* (2006.01)
    *C08F 10/00* (2006.01)

(52) U.S. Cl.
    CPC ........... *B01J 2219/24* (2013.01); *C08F 10/00* (2013.01); *Y02P 20/582* (2015.11)

(58) Field of Classification Search
    USPC .................... 526/65, 67, 70; 422/135, 134
    See application file for complete search history.

(56) References Cited

FOREIGN PATENT DOCUMENTS

| WO | WO 95/26370 A1 | 10/1995 |
|----|----|----|
| WO | WO 99/61486 A1 | 12/1999 |
| WO | WO 00/58377 A1 | 10/2000 |
| WO | WO 01/18066 A1 | 3/2001 |
| WO | WO 2005/068507 A1 | 7/2005 |
| WO | WO 2006/054040 A1 | 5/2006 |
| WO | WO 2007/071527 A1 | 6/2007 |
| WO | WO 2008/108931 A1 | 9/2008 |
| WO | WO 2008/141965 A1 | 11/2008 |
| WO | WO 2010/057925 A1 | 5/2010 |
| WO | WO 2011/011427 A1 | 1/2011 |
| WO | WO 2013/082693 A1 | 6/2013 |
| WO | WO 2013/098197 A1 | 7/2013 |

\* cited by examiner

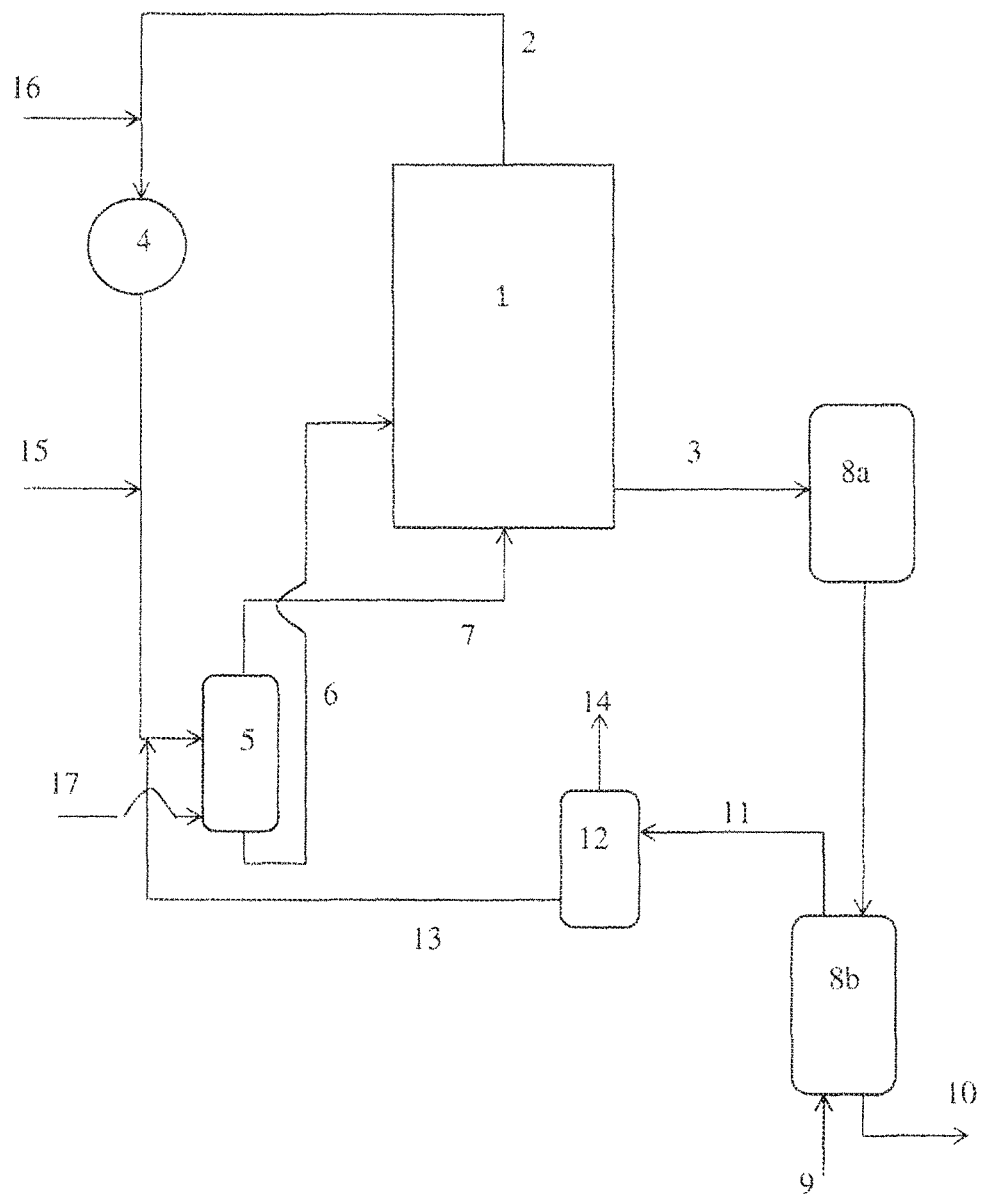

SCAVENGER INJECTION

This application is the U.S. national phase of International Application No. PCT/EP2014/077774 filed Dec. 15, 2014 which designated the U.S. and claims priority to European Patent Application No. 13199329.7 filed Dec. 23, 2013, the entire contents of each of which are hereby incorporated by reference.

The present invention relates to a process for the polymerisation of olefins in a polymerisation reactor system and in particular to a process for adding a compound that reacts with catalyst poisons (e.g. water).

BACKGROUND OF THE INVENTION

The polymerisation of olefins by bringing them into contact with a catalyst system in a reactor system comprising a gas phase reactor is known. In a fluidised bed gas phase polymerisation process, for example, a bed of polymer is maintained in a fluidised state by an ascending stream of fluidisation gas comprising the olefin, which gas exits the reactor and is then recycled.

The start-up of the polymerisation reaction in the gas phase is generally performed by introducing a pre-formed bed of polymer, known as a seedbed, to the reactor, fluidising this seedbed and forming a reaction gas mixture in the reactor, and then introducing a catalyst to initiate reaction.

Polymerisation may then be performed continuously; the catalyst system and make-up reactants and other reaction gas mixture components being introduced into the reactor continuously or discontinuously as required. The polymer produced may be withdrawn from the reactor either continuously or discontinuously. The pre-formed seedbed forms the initial fluidised bed but as reaction takes place and polymer solids are withdrawn this is replaced by a bed of the formed polymer.

The gas leaving the reactor is generally cooled before being recycled back to the reactor. In preferred processes it is cooled below a temperature at which liquid components condense out of the gas stream, and both the liquid and gaseous phases are recycled, wherein the vaporisation of the condensed liquid components in the reactor provides significant cooling to the reaction. The formation of condensed liquid from the gas exiting the reactor and the introduction of this condensed liquid into the reactor is generally known as "condensed mode" operation.

In the industrial production of polyolefins it is sometimes necessary to stop the polymerisation reaction. This may be for a number of reasons. For example, reactors may be shut-down for scheduled or unscheduled maintenance or cleaning of the reactor or other parts of the reaction system. Certain operations, such as some transition processes, also require the polymerisation to be stopped.

Impurities ("catalyst poisons") such as water and/or oxygen may be introduced into the polymerisation reactor during these various operations. For example, if the reactor is opened during the shut-down impurities such as water and/or oxygen may enter the reactor. As another example, if a new seedbed is introduced during a transition it may contain water, oxygen or other impurities which have accumulated during storage of the seedbed. These impurities can inhibit the restarting of polymerisation, and can cause significant difficulties.

For this reason it is known to purge reactors and seedbeds to remove water and other impurities. It is also known to introduce compounds, known as "scavengers" which can react with the impurities and thereby remove them.

Purging methods include pressure purging with an inert gas such as nitrogen at an elevated temperature, or flow purging the reactor with nitrogen or other suitable inert gases at a reduced pressure. A vacuum can be placed on the reactor, preferably at elevated temperature, to reduce the level of water.

With respect to scavengers, alkyl aluminium and other alkyl metal compounds such as trimethyl aluminium, triethyl aluminium and diethyl zinc have been introduced to reactors to serve as scavengers for catalyst poisons before commencing polymerisation.

Hydrocarbons such as ethane, ethylene, propane, propylene, butane, isobutane, 1-butene, n-pentane, isopentane, n-hexane and 1-hexene can also be introduced and circulated in the gaseous state to increase the heat capacity of a circulating medium and thus speed drying. For example, WO2004007571 discloses a process for the polymerisation or copolymerisation in the gas phase of olefin(s) by bringing the said olefins(s) into contact, under polymerisation or copolymerisation conditions in a reactor in which the polymer or the copolymer is maintained in a fluidised bed and/or agitated with mechanical stirring, with a catalyst system, which process comprises a pre start-up operation characterized in that, prior to the introduction of the catalytic system in the reactor, the reactor is subjected to a cleaning treatment comprising the steps of introducing into the reactor an alkane having from 4 to 8 carbon atoms, circulating said alkane across the reactor under pressure and elevated temperature, depressurizing and purging the reactor.

Combinations of the above may be used. For example, the reactor may be purged to reduce water, and then a scavenger added to reduce the water still further.

An example of a process which includes purging and scavenging of an empty reactor (prior to introduction of a new seedbed) can be found in WO 00/58377.

An example of a process in which a seedbed is added to a reactor and then treated can be found in EP 180420. This document discloses a process for the start-up of polymerisation in the gas phase by bringing an olefin in contact under polymerisation conditions in a fluidised bed and/or with mechanical stirring with a charge powder (i.e. a seedbed) in the presence of a catalyst system of the Ziegler-Natta type. The charge powder used is dehydrated and subjected to a treatment by bringing the said charge powder into contact with an organoaluminium compound for a period of at least five minutes.

SUMMARY OF THE INVENTION

We have now found that water and other impurities can accumulate in areas other than in the reactor, and an improved and more reliable start-up can be obtained if scavengers are introduced directly in parts of the reactor system other than the reactor itself.

Thus, in a first embodiment, the present invention provides a process for the polymerisation of olefins in a polymerisation reactor system, the polymerisation reactor system comprising:
  (i) a gas phase reactor having a gas outlet and one or more withdrawal lines for withdrawal of a polymer-containing stream,
  (ii) a recycle loop for recycling gas exiting the reactor through the gas outlet back to the reactor,
  (iii) a polymer separation system for separating reactants from the polymer product in the withdrawn polymer-containing stream, and (iv) a recycle system for recycling reactants removed from the reactor in the withdrawn polymer-containing stream back to the reactor,
characterised in that a scavenger is introduced directly into one or more of the recycle loop, the polymer separation system and the recycle system.

For avoidance of doubt it should be noted that the polymerisation reactor system is a circulating system, and hence addition of components in one location can lead to such components passing to other locations. The term "introduced directly" as used herein refers to scavenger being introduced into the reactor system at a particular location, and does not refer to scavenger which has been introduced elsewhere and then passed to said other location within the circulating system. In relation to the scavenger, and even if the term "directly" is not used in every instance in the present application, any reference to introduction or addition of scavenger at a particular location can be taken to refer to scavenger being introduced directly at said location.

The "polymerisation reaction system" according to the present invention, which may also be referred to herein as "reaction system", comprises
(i) a gas phase reactor having a gas outlet and one or more withdrawal lines for withdrawal of a polymer-containing stream,
(ii) a recycle loop for recycling gas exiting the reactor through the gas outlet back to the reactor,
(iii) a polymer separation system for separating reactants from the polymer product in the withdrawn polymer-containing stream, and
(iv) a recycle system for recycling reactants removed from the reactor in the withdrawn polymer-containing stream back to the reactor.

The term "recycle loop" refers to the entire system by which the gas exiting the reactor through the gas outlet is recycled back to the reactor. For avoidance of doubt this includes the possibility, which is in fact preferred, that a portion of the gas is cooled and condensed to form liquid before it is recycled to the reactor. The term "recycle loop" also includes any vents on the recycle loop. The recycle loop can include fresh feed lines if fresh feed is passed to the reactor by mixing with a recycle stream which is part of the recycle loop.

The term "polymer separation system" refers to the system by which reactants are separated from polymer product in the withdrawn polymer-containing stream. These can include lock hoppers for product withdrawal and what are known in the art as degassing and/or purging steps for subsequent polymer treatment.

The term "recycle system" refers to the entire system by which reactants removed from the reactor in the withdrawn polymer-containing stream and subsequently separated therefrom are recycled back to the reactor. The recycle system may recycle streams back to the recycle loop rather than directly back to the reactor. As used herein, reference to the recycle system recycling "back to the reactor" includes that the recycle can take place via the recycle loop, and in this case, for the purposes of the present invention, the recycle system is considered to end at the recycle loop. (Any subsequent steps and pipes by which recycle to the reactor occurs are part of the recycle loop.) The recycle system may, and typically does, recycle different recycle streams from different processing steps in the polymer separation system. The streams may include both gaseous and liquid recycle streams depending on the processing step, and in particular the stream pressure, temperature and composition. The term "recycle system" also includes any vents on the recycle system. The recycle system can include fresh feed lines if fresh feed is passed to the reactor or the recycle loop by mixing with a recycle stream which is part of the recycle system.

BRIEF DESCRIPTION OF THE DRAWINGS

This may be illustrated with respect to the FIGURE, which is a schematic of one embodiment of the present invention provided to illustrate some of the terms defined above.

DETAILED DESCRIPTION OF THE INVENTION

Thus, with respect to the FIGURE, there is shown a gas phase reactor (1), having a gas outlet (2) and a withdrawal line for withdrawal of a polymer-containing stream (3). The reactor system comprises a recycle loop comprising a condenser (4) and a separator (5), for separating condensed liquid from non-condensed gas. The recycle loop also comprises a liquid recycle line (6) for passing condensed liquid back to the reactor (1) and a gas recycle line (7) for passing the non-condensed gas back to the reactor (1).

The polymer-containing stream withdrawn through line 3 is passed to a polymer separation system having processing steps represented schematically by vessels (8a) and (8b). In particular, vessel (8a) represents schematically one or more lock hoppers which are vessels commonly used to aid withdrawal of the polymer from the high pressure in the reactor (1) with a minimum of gaseous reactants, and vessel (8b) represents schematically one or more degassing steps. With respect to (8b) the withdrawn polymer is contacted with a recycled nitrogen-containing purge gas, which purge gas is introduced via line (9) in the FIGURE. Degassed polymer is withdrawn via line (10) and passed for further processing, such as extrusion (not shown).

A mixture of purge gas and separated reactants including unreacted olefin are recovered from the one or more degassing steps (8b) via line (11), and passed to an olefin recovery system represented schematically by vessel (12).

Recovered reactants including olefin are passed via line 13, which can pass directly back to the reactor (1) but in the FIGURE is shown connecting to the recycle loop, and in particular to the line just upstream of the separator (5), and from there the reactants are recycled to the reactor (1).

Components including nitrogen which have been separated from the recovered olefin are removed via line (14). At least a portion of this stream may be recycled to line (9) and used as the purge gas (not shown).

Also shown in the FIGURE are three potential feed lines for introducing scavenger to the reaction system, and in particular to the recycle loop. Thus, line (15) can introduce components to the recycle loop between the condenser (4) and the separator (5); line (16) can introduce components to the recycle system upstream of the condenser (4), and line (17) can introduce components directly into the separator (5).

As shown in the FIGURE and as defined herein, each of 1-14 are part of the reaction system, whereas lines 15-17 are not. In particular, 2 and 4-7 represent the recycle loop, 8a and 8b represent the polymer separation system, and 11-13 represent the recycle system. As defined herein the recycle system in the FIGURE ends at the point where line 13 meets the recycle loop upstream of the separator (5).

According to the present invention a scavenger is introduced directly into one or more of the recycle loop, the polymer separation system and the recycle system.

Whilst the object of the present invention is specifically to introduce scavenger at these locations because they are outside of the reactor, it is worth noting that via such locations the introduced scavenger may end up also being passed to the reactor but only indirectly, and in particular only via a recycle line (either via the recycle loop or the recycle system).

Accordingly, the scavenger introduced directly into one or more of the recycle loop, the polymer separation system and the recycle system is not passed to the reactor directly nor via any fresh feed lines which themselves feed directly to the reactor e.g. a fresh comonomer feed line to the reactor.

Preferably, the scavenger introduced directly into one or more of the recycle loop, the polymer separation system and the recycle system is not introduced directly in any line, even in the recycle loop or recycle system, which line itself feeds directly to the reactor. A line is considered to feed directly to the reactor if there is no intermediate equipment (in the direction of flow) between it and the reactor.

The term "equipment" as used herein means, exclusively, vessels (drum, separator, etc. . . . ), pumps, compressors and condensers. As used herein this term therefore excludes pipework, and whilst liquid may be present in, and flow along, such pipework, pipework is not considered equipment in which liquid may accumulate.

Preferably, therefore, scavenger is introduced into equipment which is in the recycle loop, in the polymer separation system or in the recycle system, or in a line upstream of such equipment such that it passes through said equipment before it can be passed to the reactor.

Preferably, scavenger is introduced into a vessel which is in the recycle loop, in the polymer separation system or in the recycle system, or in a line or equipment upstream of a vessel such that it passes through the vessel before it can be passed to the reactor.

For avoidance of doubt, it should be noted that scavenger may be, and preferably is, introduced at more than one location. In such embodiments scavenger may be introduced directly to the reactor or via a fresh feed line thereto, but scavenger must also be introduced directly into one or more of the recycle loop, the polymer separation system and the recycle system.

Most preferably, scavenger is introduced directly into more than one location on one or more of the recycle loop, the polymer separation system and the recycle system. It has been particularly found that water and other impurities can accumulate in the polymerisation reactor system in areas where liquid accumulates during polymerisation. For example, the recycle loop may, and preferably does, comprise at least one step where, during polymerisation, the gas which has exited the reactor is cooled sufficiently to form condensed liquid.

It has been found that an improved and more reliable start-up can be obtained if scavengers are introduced directly into these parts of the reactor system. Thus, scavenger may be introduced directly into at least one area in the reactor system where liquid is present during polymerisation.

In one embodiment, scavenger may be introduced into or upstream of any vessels or other equipment in which liquid may accumulate during polymerisation, especially in any such vessels or other equipment which are part of the recycle loop.

For example, the recycle loop in the reaction system according to the present invention may comprise a condenser for cooling of the gas which has exited the reactor sufficiently to form a mixture of gas and condensed liquid and a subsequent separator wherein at least part of the condensed liquid is separated from the mixture. Such a system is known, for example, from WO 94/28032, and allows liquid and gas streams to be separately returned to the polymerisation reactor.

In this embodiment scavenger may be introduced into a line upstream of the separator such that it passes through the separator before it can be passed to the reactor.

In one example scavenger may be introduced into or upstream of the condenser such that it passes through the condenser and separator before it can be passed to the reactor. For example, there may be connected to the line by which liquid from the separator is passed back to the reactor (liquid recycle line (6) in the FIGURE) a recycle line by which a portion of the liquid is instead recycled to upstream of the condenser, and scavenger may be added in this recycle line and thereby be passed into the condenser.

Scavenger may be introduced in a line where liquid is present during polymerisation which line feeds directly or indirectly to the separator. For example scavenger may be introduced in the line between the condenser and the separator.

As another example, there may be connected to the line by which liquid from the separator is passed back to the reactor (liquid recycle line (6) in the FIGURE) a recycle line by which a portion of the liquid is instead recycled to the separator, and scavenger may be added in this recycle line and thereby be passed into the separator.

As yet another example, a fresh feed, such as fresh comonomer, may be passed to the process via a feed line to the separator and scavenger may be introduced to the separator in the same line. (For avoidance of any doubt the fresh feed line itself is not considered part of the reaction system, but a feed thereto. The introduction to the reaction system of the fresh feed and scavenger in this embodiment occurs where the fresh feed line enters the separator.)

As a yet further option, the recycle system for recycling reactants separated from the withdrawn polymer in the polymer separation system back to the reactor may do this via a feed line to the separator, and scavenger can be introduced in this line.

Preferably, scavenger is introduced directly to the separator. Within the separator scavenger is preferably introduced below the inlet by which the cooled recycle gas is passed into the separator, and most preferably is introduced directly into the liquid phase in the separator.

Alternatively, or additionally, scavenger may be introduced directly in other parts of the reaction system where liquid may be present/may accumulate.

Examples of such locations include olefin recovery steps in the recycle system where the olefin is condensed, and lines or equipment in the recycle system by which the condensed olefin is recycled to the reactor.

For example, polymer which is removed from the reactor entrains with it quantities of reaction gas mixture. These are separated from the polymer particles in the polymer separation system, generally in one or more processing steps in the polymer separation system, and most usually in a process generally referred to as degassing. This usually involves purging of the polymer particles, preferably with an inert gas, and most preferably with nitrogen. It is desirable to recover unreacted olefins from the purge gas, which necessitates separating them from the purge gas. This generally entails low temperature condensation of the olefins to form liquids which can be separated and recycled. Thus scavenger may be introduced directly to any part of this recovery system where the recovered condensed liquid will be present/will accumulate during polymerisation.

As example of such a process can be found in U.S. Pat. No. 7,696,289. In particular FIG. 4 and the associated description describe the recovery and recycle of condensed liquid stream derived at least in part from the purge gas exiting a purge vessel (18).

A yet further example of olefin recovery and recycle arises in process vent treatments. Process vents are generally present on a polymerisation process to prevent accumulation of inerts in the process. (The removal of gaseous and liquid streams to prevent accumulation of inerts in the process is often also referred to as "purging". However, to avoid confusion with other types of "purging" including reactor and seedbed purging to remove water and other impurities therein, and also purging during product treatment, the term "vent" will be used herein for removal of both gaseous and liquid streams from the process to prevent build-up of inerts or heavy compounds/hydrocarbons.)

As noted above, there may be process vents for both gaseous streams and for liquid streams, the former generally for removing inert gaseous components, such as nitrogen, whilst the latter may be removing inert liquid components, such as 2-hexene. In the present invention process vents may be present on either the recycle loop or on the recycle system, and optionally may be present on both. It can be desired to recover and recycle desired olefins (e.g. ethylene, 1-hexene) in these vents, which for the gaseous vent stream can entail low temperature treatment of the stream to condense the olefins to form liquids.

An example of this is also shown in U.S. Pat. No. 7,696,289, where FIG. 4 also shows a reactor vent (17) being passed to the same steps as the purge gas.

Although shown with a common recovery system in U.S. Pat. No. 7,696,289 it will be apparent that separate recovery steps could be used for process vents and for purge gas treatment.

A preferred location for scavenger addition in such systems would be any liquid recovery drums, such as the liquid recovery drum (23) shown in U.S. Pat. No. 7,696,289.

As a yet further example, catalyst injection to a reactor may take place through a catalyst injection nozzle. A recycle stream may also sometimes be used to aid catalyst injection to a reactor through a catalyst injection nozzle. In one embodiment therefore, scavenger may be introduced into the recycle stream to the catalyst injection nozzle. This is particularly preferred when using liquid catalysts and/or using liquids to aid catalyst injection.

As noted in the introduction, the use of scavengers to react with water and other impurities and thereby remove them from a polymerisation reactor is known.

The preferred scavengers according to the present invention are metal alkyl compounds. Non-aluminium alkyls which may be used include alkyl zinc compounds, such as diethyl zinc, and alkyl boron compounds, such as triethylborane. However, aluminium alkyl compounds are preferred.

Particular examples of alkyl aluminium compounds which can be employed are trialkyl aluminium compounds, such as triethylaluminium (TEA) and triisobutylaluminium (TiBA), and aluminoxane compounds, such as triisobutyl aluminoxane (TiBAO) and methylaluminoxane (MAO).

Mixture of scavengers can also be used. The scavenger can be introduced as a pure compound or, preferably, diluted in an organic solvent (for example in an alkane, especially in an alkane which can be (is) used as a condensing agent in the reaction).

Scavenger is preferably introduced to the desired location (or locations) prior to commencement of catalyst injection to the polymerisation process (referred to herein as "pre-start-up") but may be added to certain parts of the reaction system during the start-up phase, the "start-up phase" being defined herein as the time after catalyst injection until the production rate exceeds 50% of the targeted steady-state production rate.

For example, during the initial start-up phase of a polymerisation process the reaction rate may be relatively low. The production rate is ramped up with time, but initially condensation of the recycle gas may not be required. Thus, addition of scavenger to scavenge water or other impurities in a gas-liquid separator may still be performed even though polymerisation in the reactor has started.

Similarly, during a start-up it may not be necessary to have process vents, and hence scavenger can still be added the vent recovery system to scavenge water and other impurities even though polymerisation in the reactor has started.

It should be noted that a number of the potential locations for scavenger injection only have liquid present during operation, and thus prior to catalyst injection or even during the start-up phase not all of the areas in which liquid is present during polymerisation will have liquid present. For example, it is generally desired to have liquid present in a separator on a recycle loop even prior to start-up, but recycling reactants separated from withdrawn polymer-containing stream does not take place until polymer production starts, and hence areas where liquids are present during polymerisation may not have liquid initially.

Nevertheless such locations can be subject to contamination from previous operation, and scavenger addition to such locations pre-start up or during the start-up phase is still within the scope of the present invention. Thus, reference to areas where liquids are present "during polymerisation" mean that liquids are present in such locations when operating at targeted steady-state production rate, not that liquid need be present at the time of scavenger introduction.

For avoidance of doubt, where scavenger is introduced to the desired location (or locations) prior to commencement of catalyst injection to the polymerisation process (referred to herein as "pre-start-up") it is not necessary that scavenger is also added to the desired location(s) after commencement of polymerisation e.g. during the start-up phase or at steady-state.

EXAMPLES

General Process

A polymerisation process was performed in a fluidised bed polymerisation reactor system of the type shown schematically in the FIGURE.

The reactor was prepared by loading a seed bed of polymer in the reactor (1) and fluidising this with a hot reactive gas mixture comprising ethylene, 1-butene, hydrogen, nitrogen and iso-pentane which is circulated through the reactor. The reactor temperature is then adjusted to the desired reaction temperature. This takes place over several hours.

During this time the separator (5) is partially filled with liquid iso-pentane ready for use during polymerisation.

Polymerisation is subsequently initiated by injecting a polymerisation catalyst into the reactor.

Fluidising gas recovered from the reactor via the gas outlet (2) is recycled to the reactor via the recycle loop. Before catalyst injection the recovered gas is recycled without cooling via line 7, whilst line 6 is not used. Once polymerisation is initiated the recovered gas is cooled but not initially condensed. As reaction rate increases (and hence so does the heat of polymerisation it is required to remove) the cooling is increased such that the condensable components in the recycle gas are condensed in the condenser (4) and passed to a separator (5). The condensed components pass to the base of the separator displacing the isopentane already present, and liquid recycle to the reactor from the separator via line 6 is started. Non-condensed components continue to be recycled via line 7.

Polymer withdrawal takes place via line 3, lock hopper vessel (8a) and a two-stage degassing system (8b). A mixture of purge gas and separated reactants including unreacted olefin are recovered via a recycle system comprising olefin recovery system (12).

The olefin recovery process comprises low temperature condensation of the olefins in the purge gas to form liquids which are separated in a recycle system separator and passed via line 13, to the recycle loop upstream of the separator (5).

Comparative Example

In the Comparative Example triethyl aluminium is added as a scavenger directly to the reactor, but none is added outside the reactor i.e. in the recycle loop, the polymer separation system or the recycle system.

It is fed to the reactor at 2 kg/hr for 4 hours prior to reaction, after which time water analysers show that impurity levels are suitable for start-up (<1 ppm vol), and continued at the same rate once reaction has commenced.

Reaction starts as expected. As the cooling is increased leading to condensation of the recycle gas and the start of recycle of condensed liquid, the catalyst activity is seen to reduce and hot spots appear on the reactor wall (generally a sign of agglomerate formation).

Analysis of the reactor gas phase composition identifies the presence of water which is acting to poison the catalyst, despite the fact that scavenger has been to the reactor over several hours prior to this.

The reaction is terminated and the reactor further scavenged and then purged to remove the water.

This Comparative Example shows that, even in a system in which gas exiting the reactor is circulated through the recycle loop, scavenger addition to the reactor does not remove all water from the recycle loop.

Example 1

During the start-up phase prior to catalyst injection to the reactor 2 kg of pure triethyl aluminium is fed to the base of the separator (5) into the iso-pentane therein and circulated for one hour. This is then purged and the separator refilled with fresh isopentane.

The reaction is generally otherwise initiated as described above.

Reaction starts up as expected. No signs of excessive water are observed in the gas phase in the reactor.

This Example shows that an improved start-up is obtained by introducing scavenger directly into the recycle system, and in particular into the liquid phase in the separator on the recycle system.

Example 2

Example 1 is repeated except that prior to commencement of recovery and recycle of olefin and other reactants from the purge gas in the olefin recovery system (12) TEAL is added to the recycle system separator and then purged therefrom.

Reaction again starts up as expected. No signs of excessive water are observed in the gas phase in the reactor.

The invention claimed is:

1. A process for the polymerisation of olefins in a polymerisation reactor system, the polymerisation reactor system comprising:
   (i) a gas phase reactor having a gas outlet and one or more withdrawal lines for withdrawal of a polymer-containing stream,
   (ii) a recycle loop for recycling gas exiting the reactor through the gas outlet back to the reactor,
   (iii) a polymer separation system for separating reactants from the polymer product in the withdrawn polymer-containing stream, and
   (iv) a recycle system for recycling reactants removed from the reactor in the withdrawn polymer-containing stream back to the reactor,
   the process comprising introducing a scavenger directly into one or more of the recycle loop, the polymer separation system and the recycle system and into or upstream of a vessel or other equipment which is in the recycle loop, in the polymer separation system or in the recycle system and in which liquid may accumulate during polymerisation.

2. A process according to claim 1 wherein the recycle loop comprises at least one step where, during polymerisation, the gas which has exited the reactor is cooled sufficiently to form condensed liquid.

3. A process as claimed in claim 2 wherein the recycle loop in the reaction system comprises at least one step where, during polymerisation, the gas which has exited the reactor is cooled sufficiently to form a mixture of gas and condensed liquid and a subsequent separator wherein at least part of the condensed liquid is separated from the mixture.

4. A process as claimed in claim 3 wherein scavenger is introduced into a line upstream of the separator.

5. A process as claimed in claim 4 wherein scavenger is introduced in the line between the condenser and the separator.

6. A process as claimed in claim 3 wherein a fresh feed is passed to the process via a feed line to the separator and scavenger is introduced to the separator in the same line.

7. A process as claimed in claim 3 wherein scavenger is introduced directly to the separator.

8. A process as claimed in claim 7 wherein scavenger is introduced directly into the liquid phase in the separator.

9. A process as claimed in claim 1 wherein scavenger is introduced directly in one or more olefin recovery steps in the recycle system where the olefin is condensed, and/or in lines or equipment in the recycle system by which the condensed olefin is recycled to the reactor.

10. A process as claimed in claim 1 wherein scavenger is introduced directly in one of more steps by which olefins are recovered by condensation from a process vent.

11. A process as claimed in claim 1 wherein scavenger is introduced in a recycle stream to a catalyst injection nozzle.

12. A process as claimed in claim 1 wherein scavenger is introduced to said one or more of the recycle loop, the polymer separation system and the recycle system prior to commencement of catalyst injection.

13. A process as claimed in claim 4 wherein scavenger is introduced prior to commencement of catalyst injection.

14. A process as claimed in claim 6 wherein scavenger is introduced prior to commencement of catalyst injection.

15. A process as claimed in claim 7 wherein scavenger is introduced prior to commencement of catalyst injection.

16. A process as claimed in claim 6 wherein a fresh feed is fresh comonomer.

* * * * *